(12) United States Patent
Haas

(10) Patent No.: US 8,219,243 B2
(45) Date of Patent: Jul. 10, 2012

(54) AUTOMATED STORE ARRANGEMENT AND METHOD FOR STORING AND DISPENSING MEDICAMENTS

(76) Inventor: Gerhard Haas, Waldbrunn (DE)

( * ) Notice: Subject to any disclaimer, the term of this patent is extended or adjusted under 35 U.S.C. 154(b) by 756 days.

(21) Appl. No.: 12/159,601

(22) PCT Filed: Dec. 18, 2006

(86) PCT No.: PCT/EP2006/069854
§ 371 (c)(1),
(2), (4) Date: Oct. 6, 2008

(87) PCT Pub. No.: WO2007/077117
PCT Pub. Date: Jul. 12, 2007

(65) Prior Publication Data
US 2010/0168910 A1 Jul. 1, 2010

(30) Foreign Application Priority Data
Dec. 30, 2005 (DE) .......................... 10 2005 063 197

(51) Int. Cl.
*B65G 1/137* (2006.01)
(52) U.S. Cl. .................. 700/216; 700/214; 700/231
(58) Field of Classification Search .................. 700/216, 700/214, 215, 231
See application file for complete search history.

(56) References Cited

U.S. PATENT DOCUMENTS

| | | | |
|---|---|---|---|
| 3,917,045 A | | 11/1975 | Williams et al. |
| 4,546,901 A | * | 10/1985 | Buttarazzi ....................... 221/10 |
| 5,468,110 A | * | 11/1995 | McDonald et al. ........... 414/273 |
| 7,006,893 B2 | * | 2/2006 | Hart et al. ...................... 700/235 |

FOREIGN PATENT DOCUMENTS

| | | |
|---|---|---|
| DE | 4336885 | 4/1995 |
| DE | 19509951 | 9/1996 |
| DE | 68928331 | 1/1998 |
| DE | 69614054 | 3/2002 |
| WO | WO 9210985 | 7/1992 |

* cited by examiner

*Primary Examiner* — Patrick Mackey
(74) *Attorney, Agent, or Firm* — Claude A. S. Hamrick; IPXLAW Group LLP

(57) ABSTRACT

An automated store arrangement for storing and dispensing medicaments with at least one operating device for storing and retrieving medicament containers, a dispensing device, and a control device. The containers may respectively accommodate a multiplicity of medicament portions and have an integrated discharge device. The dispensing device has at least one container receptacle, to which the operating device can respectively feed a container and from which the operating device can pick up the container, a release device, which can activate the discharge device of the container, and a packing device, which can accommodate a number of emerging medicament portions and pack them into the medicament. The control device is coupled to the operating device and to the release device and the packaging device and controls them in such a way that medicament portions of at least one predetermined kind are packed in a respectively predetermined number and sequence.

21 Claims, 1 Drawing Sheet

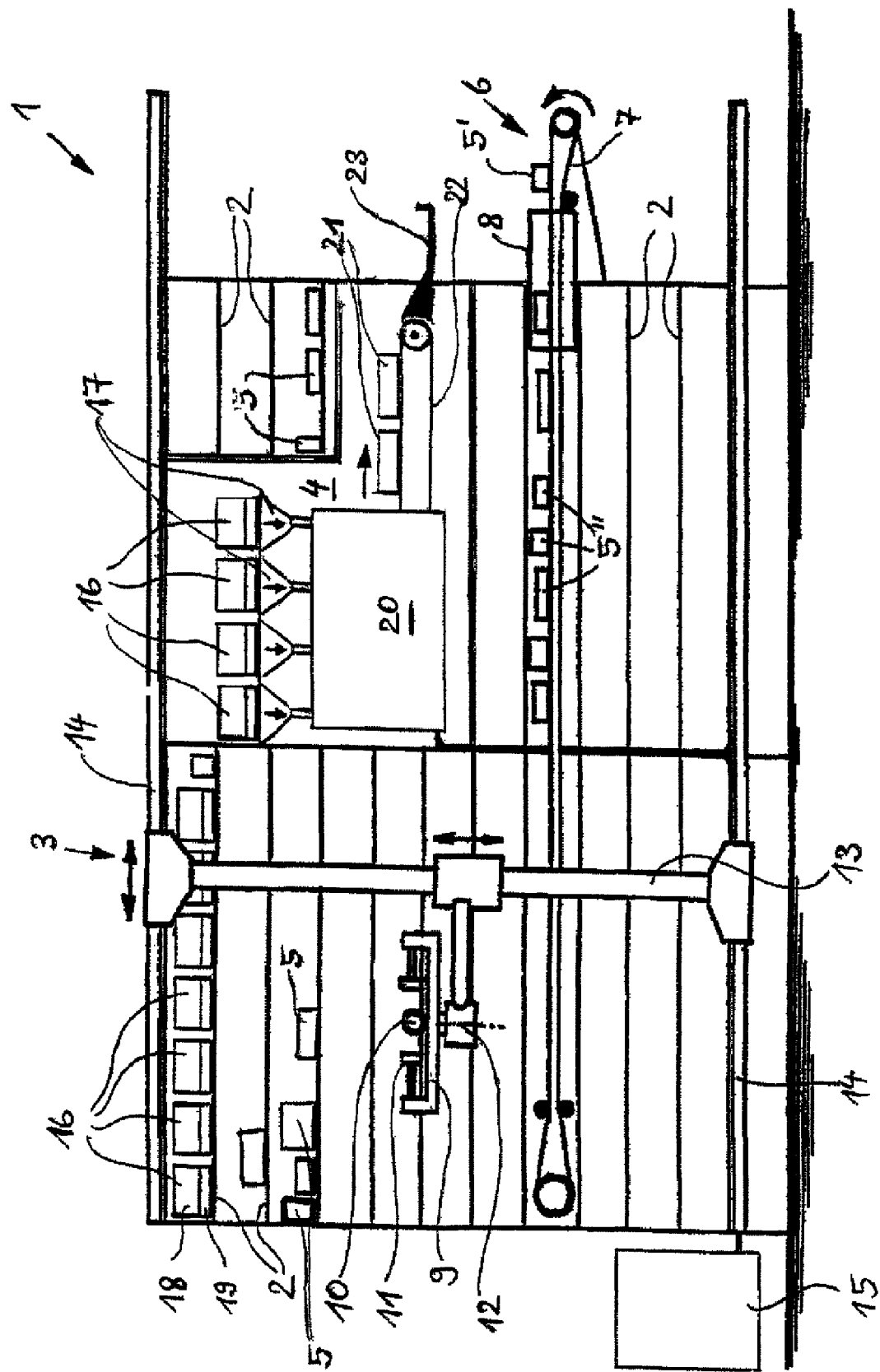

AUTOMATED STORE ARRANGEMENT AND METHOD FOR STORING AND DISPENSING MEDICAMENTS

The invention relates to an automated store arrangement for storing and dispensing medicaments and to a method for storing and dispensing medicaments in and from an automated store arrangement.

In pharmacies, medicaments are usually stored in the form of packs and bottles, the packs usually being cuboidal and containing possibly containers (for example bottles) or blister packs for receiving a predetermined number of tablets, capsules or ampoules (hereafter referred to as "medicament portions"). In pharmacies, these medicament packs and bottles have traditionally been stored in cabinets (systems of manually operated drawers).

Modern storage systems, such as those known for example from DE 195 09 951 C2, are in the meantime taking the place of the manual systems. In these modern systems, the medicament packs are stored on storage areas (for example on level shelves or sloping storage compartments), which can be accessed by means of automated removal systems (operating devices and conveying devices) in such a way that computer-controlled retrieval (dispensing) of desired medicament packs is possible. In the case of some of the modern storage systems, automated initial storage of the medicament packs is additionally possible.

A feature of some systems that are established on the market is the chaotic storage of the packs. The medicament packs are for example stored on level glass shelves without any definite pre-assignment of storage locations while optimizing use of the surface area, a computer system managing the storage locations of all the packs and controlling an operating device accessing the packs. Identical packs need not lie next to one another; rather, the medicament packs may be distributed arbitrarily overall the storage areas, one of the criteria for selecting the storage areas during initial storage being that of achieving optimum use of the surface area.

These modern storage systems permit the automated discharge of complete medicament packs previously put in the store. A number of identical or different medicament packs can be dispensed, it being possible for the kind and number of the medicament packs dispensed to correspond to a customer order or a prescription.

However, it is not possible in principle for individual medicament portions (tablets, capsules, blister packs or parts thereof) to be dispensed or put back into storage again if they are not required. Discharging of medicaments as individual doses, for example on the basis of a prescription in which a series of individual doses (tablets or capsules) for predetermined times in the future are packed in the sequence in which they are to be taken (for example sealed in foils or blister packs) has had to be performed by the pharmacist manually or with separate devices. A pharmacist wishing to pack individual doses in an automated manner in accordance with a prescription in such a way that they are allocated to specific times at which they are to be taken requires separate dispensing systems to do so, and these require a separate container for each medicament to be prepared in this way (for example for each kind of tablet or capsule), the container containing the tablets or capsules in loose form, and a device including a mechanism with the aid of which the individual tablets or capsules can be taken from containers.

In the case of the systems provided for automatic packing (for example sealing or blister packing), each of these containers from which a tablet or a capsule is required for a pack that is to be produced can be inserted in a special receptacle of an automated machine, the number of such receptacles limiting the number of different medicaments that can be introduced into the same pack. If, for example, a medicament that is not contained in any of the containers lying in the receptacles is to be sealed in a pack, removal of a container and subsequent loading of a container containing the required medicament is required.

The object of the invention is to provide an automated pharmacy storage system that allows not only storage and dispensing of conventional medicament packs but also a low-cost way of discharging medicaments in individual doses.

This object is achieved according to the invention by an automated store arrangement with the features of patent claim 1 and a method for storing and dispensing medicaments with the features of patent claim 10.

The basic idea of the invention is to incorporate automated dispensing devices permitting the dispensing of medicaments as individual doses in modern automated storage systems in such a way that the modern storage systems can manage and handle not only the conventional medicament packs but also in the same way containers of the dispensing device (cartridges) that each contain a multiplicity of medicament portions (tablets, capsules, ampoules or the like), the cartridges and/or the operating devices being adapted in such a way that the cartridges to be inserted into the dispensing device can be quickly exchanged with the aid of the operating device of the modern storage system, with the result that the dispensing devices require only few receptacles for such cartridges and nevertheless achieve greater flexibility. This leads to considerably lower-cost dispensing systems.

The automated store arrangement according to the invention for storing and dispensing medicaments has a number of storage areas that can each receive a number of medicament packs and/or cartridges. The storage areas may for example be level shelves or resting surfaces of sloping storage compartments. The medicament packs comprise for example cuboidal packs which contain sealed-in (blistered) tablets, capsules or ampoules or else bottles or vials. The cartridges can each receive a multiplicity of medicament portions and have an integrated dispensing device for dispensing individual medicament portions. Medicament portions are for example singulated tablets, capsules or ampoules. It goes without saying that the medicament portions also comprise small pack units each comprising a number of identical or different tablets. In a simple case, the integrated dispensing device may have only one opening, which is formed and arranged in such a way that it discharges the medicament portions individually one after the other as long as the opening is exposed. However, the integrated dispensing device may also be a complicated electromechanical singulating mechanism, in this case the cartridge being fed a voltage supply for the mechanism and control signals for activating the mechanism. The feature of the store arrangement according to which the number of storage areas can each receive a number of medicament packs and/or cartridges specifies that for example in one embodiment all the storage areas receive both medicament packs and cartridges, but in other embodiments only selected storage areas can receive not only the medicament packs but also cartridges, or in yet other embodiments certain storage areas may be reserved for exclusively receiving cartridges.

The automated store arrangement according to the invention also has at least one operating device for storing and retrieving medicament packs and cartridges on or from the storage areas. The operating device, which may for example have a jaw gripper and/or suction gripper, but which may also be a sloping buffer compartment that can be made to move in front of storage compartments and has a release device for the removal of individual items from storage compartments, is formed in such a way that it can grip or pick up both medicament packs and cartridges, the cartridges optionally being designed or adapted in such a way that they can be gripped or picked up by the operating device.

Furthermore, the automated store arrangement according to the invention has a dispensing device for producing medicament packs each containing a number of medicament portions. Producing means here that the pack completely filled with medicament portions is produced; however, it does not necessarily mean that the container or the wrapping of the pack produced also has to be newly produced in each case. The dispensing device has at least one cartridge receptacle, a release device and a packing device. The operating device can in each case feed a cartridge to the cartridge receptacle (or each of the cartridge receptacles), the operating device also being able to remove the cartridge again from the cartridge receptacle. The dispensing device preferably has a number of cartridge receptacles, the number being optimized in such a way that the dispensing device is as small as possible, while at the same time achieving the highest possible production rate. If the number of cartridge receptacles is chosen to be too small, it may happen in the production of medicament packs (for example blister packs) that contain a number of different medicament portions that the cartridges lying in the cartridge receptacles have to be changed too often for the production of the blister packs. If, on the other hand, the number of cartridge receptacles is chosen to be too high, the dispensing device becomes larger and more expensive. The release device of the dispensing device may activate the discharge device of the cartridge contained in a cartridge receptacle in such a way that portions emerge in a predetermined number. The discharge device of the cartridge and the release device of the dispensing device are coordinated with each other in such a way that they together ensure that the medicament portions are removed individually and in a predetermined number and sequence. "Activating" the discharge device by the release device means here for example that—in the case of a simple mechanical cartridge discharge mechanism—the latter is actuated by an electrically activated release device in such a way that the desired number of medicament portions emerge in the desired sequence. In the case of an integrated discharge device that has an electronically controlled discharge mechanism, "activating" means that this discharge mechanism is for example supplied with supply voltage and control signals that specify the number of medicament portions in the desired sequence. The packing device of the dispensing device can in each case receive a number of emerging medicament portions and pack them in the medicament pack to be produced. Said packing device may simply be a device that seals the medical portions in foils or fills them in a number of small contiguous plastic cups and then closes the latter, it being possible for the individual positions in the sealed foil or in the blister pack or the individual plastic cups to be allocated to specific times for the medicaments to be taken.

The automated store arrangement according to the invention finally has a control device, which is coupled to the operating device and to the release device and the packing device and controls them in such a way that medicament portions of at least one predetermined kind are packed in a respectively predetermined number and sequence in the medicament pack to be produced. The control device preferably comprises a microprocessor controller.

In the case of one embodiment of the automated store arrangement, the storage areas are level shelves of a high-bay store. The operating device is preferably able to move in front of the shelves and has a (level) transporting table and can draw the medicament packs or cartridges from the shelves onto the transporting table. This requires that not only the medicament packs but also the cartridges have a base or a resting surface that allows them to be drawn over a level surface. In the case of the preferred embodiment of this kind, the operating device has a suction gripper. The cartridges have here a substantially vertically arranged planar side face, to which the suction gripper can attach itself.

In the case of a preferred embodiment of the automated store arrangement, the medicament packs and the cartridges are stored on the storage areas chaotically and with optimum use of the storage areas available. A cartridge may in this case be stored at any desired location at which there is sufficient storage space available for receiving the cartridge and at which the unoccupied storage area is large enough to receive a cartridge. In the case of a preferred arrangement, whenever a number of free storage areas are available at the same time for receiving a cartridge, that storage area that allows quickest possible transport of the cartridge to the cartridge receptacle of the dispensing device is selected by the control device.

In the case of one embodiment of the automated store arrangement, the integrated discharge device of a cartridge comprises a mechanically actuable dispensing mechanism for dispensing in each case an individual medicament portion. The release device of the dispensing device has in this case an actuating mechanism that can be triggered by electrical control signals of the control device for actuating the dispensing mechanism. In the case of another embodiment, in which a greater part of the intelligence is relocated into the cartridge, the integrated discharge device of the cartridge comprises an electromechanical dispensing mechanism that can be actuated by electrical control signals for dispensing individual medicament portions and an interface with first contacts. The release device of the dispensing device comprises an interface that receives control signals of the control device and has second contacts arranged on the cartridge receptacle, the first contacts being connected to the second contacts in such a way that the control signals and a voltage supply can be passed on to the electromechanical dispensing mechanism whenever a cartridge is lying in the cartridge receptacle.

In the case of a preferred development, the dispensing device of the automated store arrangement has a marking device for marking the medicament packs that are to be produced. This marking device may comprise a printer, a barcode printer or a stamping device. These can be used to apply inscriptions, barcodes or stamps to the medicament packs, identifying the medicament packs and/or comprising directions for taking the medicament, recommended dosages and the like. In the case of one embodiment for example a barcode is printed onto the medicament pack produced, it being possible for the barcode to be assigned in the control device information that clearly identifies the medicament contained in the pack and its arrangement and sequence. The marking device may also be a device for correspondingly programming an RFID tag of the medicament pack produced.

In the case of the method according to the invention for storing and dispensing medicaments in and from an automated store arrangement, cartridges that can each receive a multiplicity of medicament portions and have an integrated discharge device for discharging individual medicament portions as well as medicament packs (of a conventional kind) are stored on storage areas of an automated store. If, later, at least one desired medicament is then to be dispensed, a medicament pack that contains the at least one desired medicament and/or at least one cartridge that contains a medicament portion corresponding to the at least one desired medicament is gripped or picked up by an operating device and removed from the storage area. If a medicament pack containing at least one desired medicament has been removed, the medicament pack is brought by the operating device to a medicament dispensing location (of the overall arrangement). If, on the other hand, a cartridge containing a medicament portion corresponding to the at least one desired medicament has been removed, the cartridge is brought by the operating device to a cartridge receptacle of a dispensing device. It goes without saying that this step is only performed if such a cartridge is not already located in a cartridge receptacle of the dispensing device. If at least one cartridge has been brought to a cartridge receptacle or is located there, the discharge device of the at least one cartridge is activated in such a way that at least one medicament portion corresponding to the at least one desired medicament is removed from the cartridge. The at least one medicament portion is then packed by the dispensing device in a medicament pack to be produced, with the result that medicament portions of the kind corresponding to at least one desired medicament are packed in the appropriate number and sequence in the medicament pack to be produced.

The medicament pack produced in the dispensing device can subsequently be brought to the medicament discharging location. The discharging location is for example a location on a transporting belt, which transports the medicament pack to a predetermined discharging location of the pharmacy. The medicament pack produced may, however, also be gripped by the operating device and brought to one of the storage areas. For example, a medicament pack may be already produced by the dispensing device of the automated store arrangement on the basis of information of a prescription that has been transmitted via a data communications network before the recipient patient appears at the pharmacy. The medicament pack produced is then temporarily stored on the storage areas until it is collected by the patient. Only then is it removed again from the storage area and transported to the pharmacy discharging location.

If the medicament pack produced (for example a tablet blister pack) cannot be gripped directly by an operating device (for example a suction gripper), it is provided in the case of a preferred embodiment that the medicament pack produced is first placed into a container and the container is gripped by the operating device and brought to one of the storage areas. Later (when the medicament is collected), the container is gripped once again by the operating device and brought to a medicament discharging location. The medicament pack produced is removed and the container is returned to the dispensing device.

Advantageous and/or preferred developments of the invention are characterized in the subclaims.

The invention is explained in more detail below on the basis of a preferred exemplary embodiment of the automated store arrangement according to the invention.

FIG. 1 shows a schematic representation of an embodiment of the automated store arrangement according to the invention.

The store arrangement 1 shown in FIG. 1 combines a high-bay store, which has level shelves 2 and an operating device 3 that can be made to move in front of the shelves 2, with a dispensing device 4 for producing medicament packs that each contain a number of medicament portions of the same kind or different kinds.

Stored on the shelves 2 of the high-bay store are medicament packs 5, which can be stored and retrieved by means of an operating device 3. For the purpose of initially storing medicament packs 5, the store arrangement 1 has a storing station 6, at which the medicament packs 5' can be placed on a circulating conveyor belt 7 by a user. A medicament pack 5' placed onto the conveyor belt 7 runs through an identifying and measuring station 8, which is schematically represented in FIG. 1 and in which the dimensions of the medicament pack 5' to be stored are sensed and identification information (for example a barcode) arranged on the pack is read. Once a medicament pack 5' that is to be stored has run through the identifying and measuring station 8 on the conveyor belt 7, it passes into a region of the conveyor belt 7 that can be accessed by the operating device 3, in order to remove the medicament pack that is to be stored from the conveyor belt 7 and transport it to a suitable storage location on one of the shelves 2. The portion of the conveyor belt that is arranged in the access range of the operating device 3 forms a storing buffer for the identified and measured medicament packs 5" that are to be stored. Instead of the storing station shown in FIG. 1 and the storing buffer comprising a conveyor belt, a series of alternative arrangements and devices may be used for identifying, measuring, positioning and temporarily storing (buffering) medicament packs that are to be stored. For example, storing devices in which a relatively great quantity of different medicament packs to be stored are simply tipped into a receiving bunker, followed by automated singulating of the packs, identifying, measuring and positioning of the packs to be stored at a location that is accessible for the operating device, are conceivable.

The operating device 3 shown in FIG. 1 has a transport table 9 with gripping devices for securely holding medicament packs, pushing medicament packs onto a shelf and drawing medicament packs down from a shelf. The gripping devices comprise for example a suction gripper 10, which can use suction to take hold of the end faces remote from the operating device 3 of medicament packs 5 resting on a shelf 2 and draw the medicament packs 5 onto the transport table 9. The gripping devices also comprise jaw grippers 11, which can place themselves onto the side walls of a pack resting on the transport table 9 and consequently center and securely hold the pack. In addition, jaw grippers and suction grippers may act together to bring about the storage and retrieval of the medicament packs onto or from shelves 2. In the case of the embodiment shown in FIG. 1, the transport table 9 may firstly rotate about an axis 12, secondly move upward or downward along a guide 13 and thirdly move in the longitudinal direction in front of the bay along the rails 14. The movement of the transport table 9 and the gripping devices 10, 11 as well as the movement of the transporting belt 7 are controlled by a control device 15. In addition, the control device 15 is coupled to the identifying and measuring station 8. The control device 15 controls the transporting belt 7 and the operating device 3 in dependence on the dimensions sensed at the measuring station as well as the sensed identification in dependence on the available storage areas on the shelves 2. A memory of the control device 15 contains all the information about stored medicament packs and their storage locations.

According to the invention, a dispensing device 4 is integrated in this automated high-bay store arrangement that is known per se. The dispensing device 4 serves for producing medicament packs that contain a predetermined number of medicament portions, i.e. tablets, capsules and/or ampoules or the like, it being possible for the medicament packs produced to contain medicament portions of the same or different kinds in a predetermined arrangement or sequence. For example, the dispensing device 4 is capable of sealing individual medicament portions in tablet blister packs or filling them into small plastic cups of a predetermined arrangement and closing the small cups. The dispensing device removes the individual medicament portions (tablets, capsules, ampoules) from cartridges 16, which lie in cartridge receptacles 17. The dispensing device 4 has a predetermined number of cartridge receptacles 17; in the case of the embodiment schematically represented in FIG. 1, four cartridge receptacles 17 each with a cartridge 16 lying in it are shown. The cartridges 16 comprise a container 18 for receiving the medicament portions and a discharge device 19, which is for example located under the container 18 and has for example a mechanism which, when activated by suitable electrical control signals, removes and dispenses individual medicament portions from the container 18. Each of the cartridge receptacles 17 has a release device, which acts together with the discharge device 19 of the cartridge 16 lying in said receptacle in such a way that medicament portions can be dispensed in a predetermined number and sequence in dependence on control signals. The dispensing device 4 is likewise coupled to the control device 15, with the result that the control device can generate the control signals to the release device. The dispensing device 4 also includes a packing device 20, which can pick up the medicament portions emerging from the cartridges 16 via the cartridge receptacles 17 and pack them in medicament packs that are to be produced. The medicament packs 21 produced leave the packing device 20 by way of a conveying device, for example a conveyor belt 22. The medicament packs 21 produced by the packing device may be removed for example from the conveyor belt 22 by the operating device 3 and temporarily stored on a shelf 2. The medicament packs 21 produced may, however, also be transported by the conveyor belt 22 to a dispensing location 23, where they can be removed by the pharmacy personnel.

According to the invention, the cartridges 16 are formed in such a way that—in the same way as a medicament pack 5—they can be gripped and transported by the gripping devices 10, 11 of the operating device 3. The cartridges 16 with the container 18 and discharge mechanism 19 have for example planar side faces and a front face that is planar (at least in a predetermined region), with the result that the jaw gripper 11 can act on the side faces and the suction gripper 10 can act on the front face. The operating device 3 is then activated in such a way that it can store the cartridges 16 on shelves 2 and remove them from shelves 2 and transport them in each case to a cartridge receptacle 17 of the dispensing device 4. In the case of the embodiment shown in FIG. 1, four cartridges 16 rest on the four cartridge receptacles 17 of the dispensing device 4, while a row of further cartridges 16 rest on the shelf 2 (at the top left). If medicament portions of a specific cartridge 16 are required by the dispensing device 4 and such a cartridge 16 is not yet resting on a receptacle 17, the operating device 3 first moves to a cartridge receptacle 17 on which a cartridge 16 that is currently not required is resting, removes this cartridge and brings it to a free discharging location on the shelf 2. Subsequently, the operating device moves to the cartridge 16 with the desired medicament portions, removes the cartridge 16 from the shelf 2 and transports the desired cartridge to the free cartridge receptacle 17 of the dispensing device 4. In this way, a dispensing device 4 with relatively few cartridge receptacles 17 can be used and, nevertheless, a large number of different medicament portions can be flexibly packed. In addition, the provision of the dispensing device 4 in the case of an automated high-bay store permits the discharge of medicaments as individual doses. An automated high-bay pharmacy store equipped in such a way can not only discharge medicament packs to patients (with or without a prescription) in the conventional way; such a store arrangement can also produce individual doses of tablets or capsules packed in a specific quantity and sequence on the basis of a prescription and deliver them to hospitals or old people's homes. Details of the patient, dosage information and directions for taking the medicament may be printed on the medicament packs produced. As a difference from the production of blister packs in hospitals or old people's homes, the production of such medicament packs in a pharmacy allows greater drug safety and relieves the personnel in hospitals and old people's homes of this task. In addition, in the case of the store arrangement according to the invention in a pharmacy, a large number of cartridges 16 can be stored in addition to the conventional medicament packs. The dispensing device is flexible, since it can be initially operated with few cartridges and later expanded to several thousand cartridges, without any need to modify the structural design of the dispensing device 4 or the operating device 3.

Many alternative embodiments are conceivable. Instead of a high-bay store with level shelves, a system with storage compartments may also be used, some of the storage compartments being able to receive cartridges. The store arrangement may have one or more dispensing devices, one or more operating devices and/or a combination of level shelves and systems of compartments. The cartridges used may be of the same size or a number of different sizes. For identification, the cartridges 16 may include an optically readable code (for example a barcode) or an RFID chip. The cartridges 16 are preferably stored in the same way as conventional medicament packs, i.e. they are identified, measured and provided in a predetermined orientation at a location at which the operating device 3 can access them. However, arrangements in which special storing stations for cartridges are provided are also conceivable. As soon as a cartridge 16 has been emptied, it is retrieved by the operating device, allowing it to be newly filled again. The cartridges 16 are preferably transported by the operating device 3 directly to the cartridge receptacles 17. Alternatively, it is also conceivable for the cartridges 16 to be initially transported by the operating device 3 to a transfer location of the dispensing device 4, the dispensing device 4 subsequently transporting the cartridges 16 further from the transfer location to the cartridge receptacles 17.

The transporting operations of the operating device 3, for example the changing of the cartridges 16, may be performed parallel to the removal of medicament portions at the dispensing device 4 and the packing thereof. For example, while medicament portions are being removed from a first cartridge and packed, a cartridge that is longer required may be removed from a cartridge receptacle and a cartridge that will subsequently be required placed in the cartridge receptacle that has become free. The control device 15 coordinates the operations in such a way that, in spite of a small number of cartridge receptacles and a small size of the dispensing device, a high production rate of medicament packs is achieved at the same time as high flexibility.

The control device 15 preferably comprises a computer system with a user interface (keyboard, mouse, display) and I/O interfaces for receiving control signals (from sensors) and for emitting control signals to adjusting devices (operating device, conveyor belt, packing device). Apart from the control software, the computer includes, inter alia, software for store management and for managing dosing plans. The data derived from the dosing plans are passed on under the control of the software to devices of the dispensing device 4, which produce appropriate imprints on the medicament pack produced.

The invention claimed is:

1. An automated store arrangement for storing and dispensing medicaments, having:
   a plurality of storage areas that each can receive a number of medicament packs and/or cartridges, wherein at least one storage area can receive a number of medicament packs and at least one storage area can receive cartridges, the cartridges each being able to contain a multiplicity of medicament portions and having an integrated discharge device for discharging individual medicament portions, at least one operating device for storing and retrieving medicament packs and cartridges on and from the storage areas, a dispensing device for producing medicament packs that each contain a number of medicament portions, the dispensing device having at least one cartridge receptacle, to which the operating device can in each case feed a cartridge and from which the operating device can remove the cartridge, a release device, which can activate the discharge device of the cartridge contained in a cartridge receptacle in such a way that medicament portions emerge in a predetermined number, and a packing device, which can in each case receive a number of emerging medicament portions and pack them in the medicament pack to be produced, and a control device which is coupled to the operating device and to the release device and the packing device and controls them in such a way that medicament portions of at least one predetermined kind are packed in a respectively predetermined number and sequence in the medicament pack to be produced.

2. The automated store arrangement as claimed in claim 1, characterized in that
the storage areas are level shelves of a high-bay store.

3. The automated store arrangement as claimed in claim 2, characterized in that
the operating device can be made to move in front of the shelves and has a transport table and can draw the medicament packs or cartridges from the shelves onto the transport table.

4. The automated store arrangement as claimed in claim 3, characterized in that
the operating device has a suction gripper.

5. The automated store arrangement as claimed in claim 1, characterized in that
the medicament packs and the cartridges are stored on the storage areas chaotically and with optimum use of the storage areas available.

6. The automated store arrangement as claimed in claim 1, characterized in that
the integrated discharge device of a cartridge comprises a mechanically actuable dispensing mechanism for dispensing in each case an individual medicament portion and
in that the released device of the dispensing device has an actuating mechanism that can be triggered by electrical control signals of the control device for actuating the dispensing mechanism.

7. The automated store arrangement as claimed in claim 1, characterized in that
the integrated discharge device of a cartridge comprises an electromechanical dispensing mechanism that can be actuated by electrical control signals for dispensing individual medicament portions and an interface with first contacts and
in that the release device of the dispensing device comprises an interface that receives control signals of the control device and has second contacts arranged on the cartridge receptacle, the first contacts being connected to the second contacts in such a way that the control signals and a voltage supply can be passed on to the electromechanical dispensing mechanism whenever a cartridge is lying in the cartridge receptacle.

8. The automated store arrangement as claimed in claim 1, characterized in that
the packing device has a device for sealing the medicament portions in foils or containers.

9. The automated store arrangement as claimed in claim 1, characterized in that
the dispensing device has a marking device for marking the medicament packs to be produced.

10. A method for storing and dispensing medicaments in and from an automated store arrangement, wherein
cartridges that can each receive a multiplicity of medicament portions and have an integrated discharge device for discharging individual medicament portions, as well as medicament packs are stored on storage areas of an automated store and then, if at least one desired medicament is to be dispensed:

at least one medicament pack that contains the at least one desired medicament and/or at least one cartridge that contains a medicament portion corresponding to the at least one desired medicament is gripped by an operating device and removed from the storage area, if a medicament pack containing at least one desired medicament has been removed, the medicament pack is brought by the operating device to a medicament dispensing location, if a cartridge containing a medicament portion corresponding to the at least one desired medicament has been removed, the cartridge is brought by the operating device to a cartridge receptacle of a dispensing device, if at least one cartridge has been brought to a cartridge receptacle, the discharge device of the at least one cartridge is activated in such a way that at least one medicament portion corresponding to the at least one desired medicament is removed from the cartridge and the at least one medicament portion is packed by the dispensing device in a medicament pack to be produced, with the result that medicament portions of the kind corresponding to at least one desired medicament are packed in the appropriate number and sequence in the medicament pack to be produced.

11. The method for storing and dispensing medicaments as claimed in claim 10 characterized in that
the medicament pack produced is brought to the medicament discharging location.

12. The method for storing and dispensing medicaments as claimed in claim 10 characterized in that
the medicament pack produced is gripped by the operator device and brought to one of the storage areas.

13. The method for storing and dispensing medicaments as claimed in claim 10 characterized in that
the medicament pack produced is placed in a container and the container is gripped by the operating device and brought to one of the storage areas,
later, the container is gripped once again by the operating device and brought to a medicament discharging location, the medicament pack produced is removed and the container is returned to the dispensing device.

14. The method for storing and dispensing medicaments as claimed in claim 10,
characterized in that
the medicament packs and the cartridges are stored on the storage areas chaotically and with optimum use of the storage areas available.

15. The method for storing and dispensing medicaments as claimed in claim 10,
characterized in that
the medicament pack to be produced or the medicament pack produced is provided with a marking during or after the packing of the medicament portions.

16. An automated store arrangement for storing and dispensing medicaments, comprising:
a plurality of cartridges each adapted to contain a multiplicity of medicament portions and including an integrated discharge device for discharging selected quantities of the contained medicament portions,
a plurality of storage areas for storing medicament packs and the cartridges,
a dispensing device including
at least one cartridge receptacle for matingly engaging the discharge device of an associated cartridge,
a release device for causing the engaged discharge device to discharge a selected quantity of the medicament portions contained in the associated cartridge, and
a packing device for receiving and packing the discharged medicament portions to form a medicament pack,
at least one operating device for transporting the medicament packs and the cartridges to and from the storage areas, and for transporting the cartridges to and from the dispensing device, and
a control device for causing the operating device to store medicament packs and the cartridges in the storage areas, for causing the operating device to select and retrieve particular ones of the cartridges and to position the selected cartridges in mating engagement with the dispensing device, for causing the release devices to cause discharge of selected quantities of the medicament portions contained within the associated cartridges, for causing the operating device to return the selected cartridges to a storage area, and for causing the packing device to develop packs of the medicament portions having particular characteristics.

17. An automated store arrangement for storing and dispensing medicaments as recited in claim 16, further comprising:
an identifying station for identifying medicament packs and cartridges input to the store arrangement; and
an input conveyor for transporting medicament packs and/or cartridges from an input station past the identifying station and into a position where the operating device can engage and transport them to the storage areas.

18. An automated store arrangement for storing and dispensing medicaments as recited in claim 17, further comprising:
a dispensing conveyor for transporting newly packed medicament packs from the dispensing device to a dispensing location.

19. An automated store arrangement for storing and dispensing medicaments as recited in claim 16 wherein the operating device includes a transport table with gripping devices for engaging and securely holding medicament packs and/or cartridges as they are transported from one location to another.

20. An automated store arrangement for storing and dispensing medicaments as recited in claim 16 wherein the storage areas are formed by a plurality of shelves upon which medicament packs and/or cartridges can be stored.

21. An automated store arrangement for storing and dispensing medicaments and filling prescriptions thereof, comprising:
a plurality of cartridges each adapted to contain a multiplicity of medicament portions and including an integrated discharge device for discharging selected quantities of the contained medicament portions,
a plurality of storage areas for variously storing medicament packs and cartridges,
a dispensing device including
at least one cartridge receptacle for engagement with a cartridge moved into a mating relationship therewith,
a release device for causing the discharge device of the mated cartridge to discharge a selected quantity of the medicament portions contained in the mated cartridge, and
a packing device for receiving and packing the discharged medicament portions to form a new medicament pack,
at least one operating device for engaging and transporting medicament packs and cartridges within the store arrangement, and
a control device
for causing the operating device to perform various operations including
retrieving medicament packs and/or cartridges from various storage areas and/or locations within the store arrangement, and positioning the retrieved medicament packs and/or cartridges in other storage areas and/or locations,
selecting and retrieving particular cartridges from the storage areas and positioning the selected cartridges in mating engagement with a cartridge receptacle for selective discharge of medicament portions, and
returning the selected cartridges to a storage area or other location following its discharge of medicament portions,
for causing the release devices of cartridges mated with a cartridge receptacle to discharge selected quantities of the medicament portions contained within the associated cartridges, and
for causing the packing device to develop packs of medicament portions having particular quantities or characteristics.

* * * * *